United States Patent
Yuan (10) Patent No.: US 9,804,706 B2
(45) Date of Patent: Oct. 31, 2017

(54) SYSTEMS AND METHODS OF ADAPTING INPUT BASED ON A CHANGE IN USER INTERFACE PRESENTATION

(71) Applicant: Telefonaktiebolaget L M Ericsson (publ), Stockholm (SE)

(72) Inventor: Song Yuan, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 56 days.

(21) Appl. No.: 14/440,913

(22) PCT Filed: Nov. 19, 2013

(86) PCT No.: PCT/EP2013/074121
§ 371 (c)(1),
(2) Date: May 6, 2015

(87) PCT Pub. No.: WO2014/079821
PCT Pub. Date: May 30, 2014

(65) Prior Publication Data
US 2015/0301683 A1    Oct. 22, 2015

Related U.S. Application Data

(60) Provisional application No. 61/738,561, filed on Dec. 18, 2012.

(30) Foreign Application Priority Data

Nov. 23, 2012 (EP) ..................................... 12193958

(51) Int. Cl.
*G06F 3/041* (2006.01)
*H04M 1/725* (2006.01)
(Continued)

(52) U.S. Cl.
CPC .......... *G06F 3/0418* (2013.01); *G06F 1/1694* (2013.01); *G06F 3/0412* (2013.01);
(Continued)

(58) Field of Classification Search
CPC .... G06F 3/0418; G06F 3/0412; G06F 3/0488; G06F 3/04886; G06F 1/1694; H04M 1/72522
See application file for complete search history.

(56) References Cited

U.S. PATENT DOCUMENTS 6,314,451 B1 * 11/2001 Landsman ............. G06Q 30/02
709/202
2002/0044299 A1 * 4/2002 Iwase ...................... H04L 29/06
358/1.15
(Continued)

FOREIGN PATENT DOCUMENTS

WO    2010029506 A1    3/2010

OTHER PUBLICATIONS

Clark, Josh, "Secrets of iPhone Application Design", Japan, O Reilly Japan Inc., Jan. 11, 2012, 1st Edition, pp. 237-247. (English Translation Attached).

*Primary Examiner* — Liliana Cerullo
(74) *Attorney, Agent, or Firm* — Coats & Bennett, PLLC (57) ABSTRACT

A mobile communications terminal (100, 200, 400, 600, 900) comprising a memory (240), a display (120) arranged to display a representation of a first user interface state, and a controller (210). The controller (210) is configured to detect a user interface changing event, change from said first user interface state to a second user interface state and cause said display (120) to display a representation of said second user interface state. The controller is further configured to
(Continued)

receive an input and interpret said input based on a time period to said event and process said input according to said interpretation.

18 Claims, 4 Drawing Sheets

(51) Int. Cl.
    *G06F 3/0488*     (2013.01)
    *G06F 1/16*     (2006.01)

(52) U.S. Cl.
    CPC ........ *G06F 3/0488* (2013.01); *G06F 3/04886* (2013.01); *H04M 1/72522* (2013.01)

(56) References Cited

U.S. PATENT DOCUMENTS

| | | | |
|---|---|---|---|
| 2005/0093846 A1* | 5/2005 | Marcus | G06F 1/1626 345/184 |
| 2009/0193357 A1* | 7/2009 | Panico | G06F 3/0481 715/803 |
| 2010/0194692 A1* | 8/2010 | Orr | G06F 3/0414 345/173 |
| 2011/0109563 A1 | 5/2011 | Liu | |
| 2011/0187661 A1* | 8/2011 | Wakizaka | G06F 3/041 345/173 |
| 2011/0296307 A1 | 12/2011 | Inami et al. | |
| 2012/0072762 A1* | 3/2012 | Atchison | G06F 9/5072 714/2 |

* cited by examiner

SYSTEMS AND METHODS OF ADAPTING INPUT BASED ON A CHANGE IN USER INTERFACE PRESENTATION

TECHNICAL FIELD

This application relates to a method, a mobile communications terminal and a computer program product for adapting the input, and in particular to a method, a mobile communications terminal and a computer program product for adapting input according to changes in a user interface presentation.

BACKGROUND

Mobile communications terminals are becoming more and more advanced running many different sorts of applications. Some applications are arranged to adapt their display view according to the orientation of the mobile communications terminal. This leads to a number of issues.

For example, if the change of the user interface style or orientation is effected just as a user makes an input, the change may be too quick for the user to realize that his input is incorrect. It may be so that the mobile communications terminal receives an input and interprets it for a changed user interface while the use meant the input to be for the original (or unchanged user interface style).

Another example is when the mobile communications terminal is currently under a heavy processing load and user interface style change is not executed in time. A user may then perform an input in a style that has not changed yet, but the mobile communications terminal will interpret the input as being for the changed user interface style.

There is thus a need for a mobile communications terminal that interprets inputs as they are meant, not necessarily according to how they are made.

SUMMARY

It is an object of the teachings of this application to overcome at least the problems listed above by providing a mobile communications terminal comprising a memory, a display arranged to display a representation of a first user interface state, and a controller, wherein said controller is configured to detect a user interface changing event, change from said first user interface state to a second user interface state cause said display to display a representation of said second user interface state, receive an input, interpret said input based on a time period to said event, and process said input according to said interpretation.

It is also an object of the teachings of this application to overcome the problems listed above by providing a method for use in a mobile communications terminal comprising a memory, a display arranged to display a representation of a first user interface state, and a controller, said method comprising detecting a user interface changing event, changing from said first user interface state to a second user interface state, causing said display to display a representation of said second user interface state, receiving an input, interpreting said input based on a time period to said event, and processing said input according to said interpretation.

It is also an object of the teachings of this application to overcome the problems listed above by providing a computer readable storage medium encoded with instructions that, when executed on a processor, perform the method according to above.

The teachings provided herein may beneficially be used in touch-based user interfaces where graphical objects may be rearranged according to a user interface state. The teachings provided herein also find use in user interfaces which utilize so-called softkeys, as the labels for the softkeys may be re-arranged or otherwise changed depending on the user interface state.

The authors of the present application have realized, after inventive and insightful reasoning, that by providing a solution based on interpreting an input based on a timing to an event and/or to the actual change of the display a simple solution to the problems is provided. This is useful in mobile communications terminals such as having a touch-based user interface or a user interface relying on softkeys, as has been mentioned above and will be described herein, where a user is most surely looking at the display when performing his input. Thus, an interpretation based on what is being displayed may be utilized with beneficial results. Unlike some systems, where a user may not look at the display for extended periods of time, such as being busy looking at an input device such as a QWERTY keypad, a change in the graphical representation of the user interface may not be perceived by a user even for longer periods of time and other measures may need to be taken such as using audible notifications. However, the manner taught herein may also be used for such systems. One example of such a system is a computer using a graphic user interface, possibly windows based, where a cursor is operated to manipulate the various graphical objects.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The actions of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
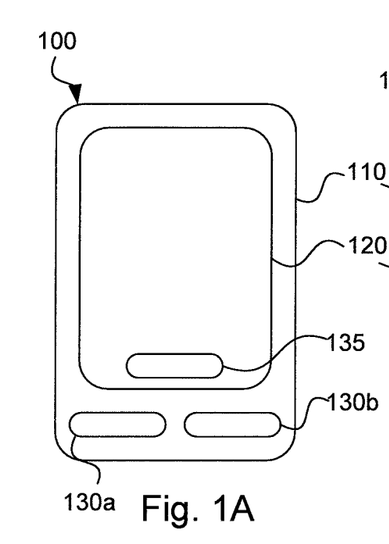
FIG. 1A and 1B are each a schematic view of a mobile communications terminal according to an embodiment of the teachings herein.
Figure 1B:
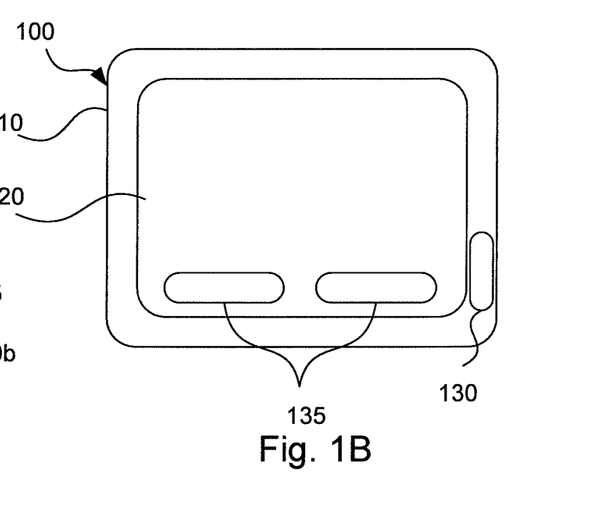

FIGS. 1A and 1B generally show a mobile communications terminal 100 according to an embodiment herein. Examples of such a mobile communications terminal 100 are an internet tablet, a mobile telephone, a smart phone and a personal digital assistant. Two embodiments will be exemplified and described as being a mobile telephone, such as a smartphone, in FIG. 1A and an internet tablet in FIG. 1B.

Referring to FIG. 1A a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 is dependent on the design of the smartphone 100 and an application that is executed on the smartphone 100.

Referring to FIG. 1B an internet tablet 100 comprises a housing 110 in which a display 120 is arranged. In one embodiment the display 120 is a touch display. In other embodiments the display 120 is a non-touch display. Furthermore, the internet tablet 100 may comprise one or more keys 130. In this embodiment there is one key 130, but any number of keys is possible and depends on the design of the internet tablet 100. In one embodiment the internet tablet 100 is configured to display and operate one or more virtual keys 135 on the touch display 120. It should be noted that the number of virtual keys 135 is dependent on the design of the internet tablet 100 and an application that is executed on the internet tablet 100.

Figure 2:
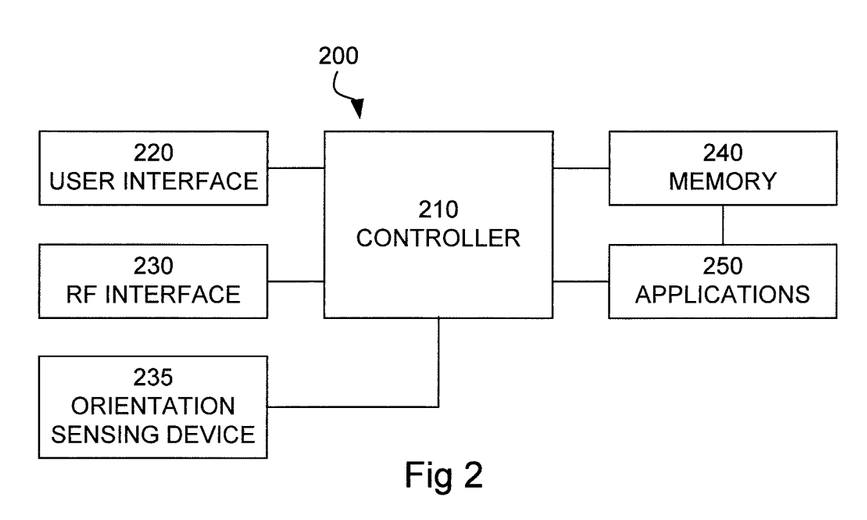
FIG. 2 is a schematic view of the components of a mobile communications terminal according to the teachings herein.

FIG. 2 shows a schematic view of the general structure of a mobile communications terminal according to FIGS. 1A and 1B. The mobile communications terminal 200 comprises a controller 210 which is responsible for the overall operation of the mobile communications terminal 200 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the mobile communications terminal 200. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The mobile communications terminal 200 further comprises one or more applications 250. The applications are sets of instructions that when executed by the controller 210 control the operation of the mobile communications terminal 200. The memory 240 is used for various purposes by the controller 210, one of them being for storing application data and program instructions 250 for various software modules in the mobile communications terminal 200. The software modules include a real-time operating system, drivers for a man-machine interface 220, an application handler as well as various applications 250. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, etc.

The mobile communications terminal 200 further comprises a user interface 220, which in the mobile communications terminal 100 of figure of 1A or 1B, is comprised of the display 120 and the keypad 130. The user interface (UI) 220 also includes one or more hardware controllers, which together with the user interface drivers cooperate with the display 120, keypad 130, as well as various other I/O devices such as sound system, LED indicator, etc. As is commonly known, the user may operate the mobile communications terminal 200 through the man-machine interface thus formed.

The mobile communications terminal 200 further comprises a radio frequency interface 230, which is adapted to allow the mobile communications terminal to communicate with other devices through a radio frequency band through the use of different radio frequency technologies.

Examples of such technologies are WIFI, Bluetooth®, W-CDMA, GSM, UTRAN, LTE, and NMT to name a few. The mobile communications terminal 200 may further comprise a wired interface, which is adapted to allow the mobile communications terminal to communicate with other devices through the use of different network technologies. Examples of such technologies are USB, Ethernet, and Local Area Network, TCP/IP (Transport Control Protocol/Internet Protocol) to name a few.

The mobile communications terminal 200 may further comprise an orientation sensing device 235, such as an accelerometer, a gyro or other means capable of detecting movement or a change in orientation. Such devices are common in the field of mobile communications terminals and a skilled person would know which device to select depending on the overall design of the mobile communications terminal 200.

The controller 210 is configured to operably execute applications 250 such as the web browsing or email application through the RF interface 230 using software stored in the memory 240 which software includes various modules, protocol stacks, drivers, etc. to provide communication services (such as transport, network and connectivity) for the RF interface 230 and optionally a Bluetooth interface and/or an IrDA interface for local connectivity.

Figure 3:
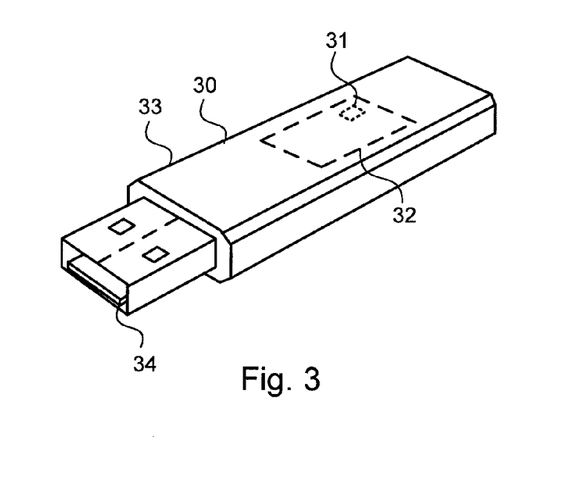
FIG. 3 is a schematic view of a computer-readable medium according to the teachings herein.

FIG. 3 shows a schematic view of a computer-readable medium 32 as described in the above. The computer-readable medium 32 is in this embodiment housed in a memory stick 30, such as a Universal Serial Bus (USB) stick. The USB stick 30 comprises a housing 33 having an interface, such as a connector 34, and a memory chip 32. In this embodiment the memory chip 32 is a flash memory, that is, a non-volatile data storage that can be electrically erased and re-programmed. The memory chip 32 is programmed with instructions 31 that when loaded (possibly via the interface 34) into a controller, such as a processor, executes a method or procedure according to the embodiments disclosed above. The USB stick is arranged to be connected to and read by a reading device, such as a mobile communications terminal 100, 200 according to FIGS. 1 and 2, for loading the instructions into the controller (referenced 210 in FIG. 2). It should be noted that a computer-readable medium can also be other mediums such as compact discs, digital video discs, hard drives or other memory technologies commonly used. The instructions can also be downloaded from the computer-readable medium via a wireless interface to be loaded into the controller.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 4A:
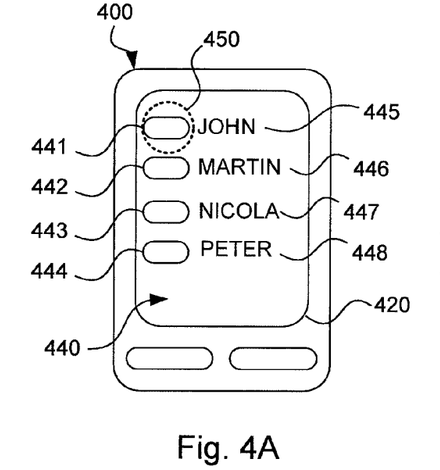
FIGS. 4A and 4B each shows a mobile communications terminal displaying a user interface state according to one embodiment of the teachings of this application.

The functionality of the manner taught herein will now be exemplified through at least three examples. FIG. 4A shows a mobile communications terminal 400, such as the smart phone 100 of FIG. 1A. The mobile communications terminal 400 in FIG. 4A is operating in a first user interface state and displaying a graphic representation 440 of the first user interface state on a display 420. In this example the display 420 is a touch display, but it should be noted that the functionality exemplified is also applicable to a display arranged to display labels for so-called softkeys (referenced 130 in FIG. 1A).

A user interface state is, in this context, defined as an arrangement of icons, virtual buttons and other graphical objects that a user may manipulate, and the corresponding functionality of the icons, virtual buttons and other manipulative objects. The user interface state is displayed as a graphical representation comprising graphical representations of the icons, virtual buttons and other manipulative objects. It should be clear to a skilled person what is meant by this term.

In the example of FIG. 4A there are four virtual buttons 441-444 displayed and four text fields 445-448. As can be seen the virtual buttons 441-444 are grouped with each a text field 445-448. As can also be seen the graphical representation of the user interface is displayed in a portrait orientation in FIG. 4A.

Also indicated in FIG. 4A is a touch area 450. The touch area 450 is indicated with a circle roughly representing the area touched by for example a user's finger.

The mobile communications terminal 400 is configured to detect an event that causes a change from the first user interface state to a second user interface state. Such events may be change in position or orientation of the mobile communications terminal 400, an application prompting a displayed prompt or window, an application changing its operational status and thereby the displayed user interface, an application receiving a communication (call, message) from a remote source (network), or a progressive changing event such as downloading a web page and displaying it while downloading it. Such an event may cause the web page to be displayed differently depending on which objects that has been downloaded. For example, the arrangement of virtual buttons, for example representing links, may vary if an image that is supposed to be displayed between the two virtual buttons has been downloaded fully or not.

It should be noted that the action of detecting an event may include the actual reception of the event. The detecting of an event may also include the processing of an event to load the event and any resulting user interface notification into a stack for displaying representations of user interfaces.

Figure 4B:
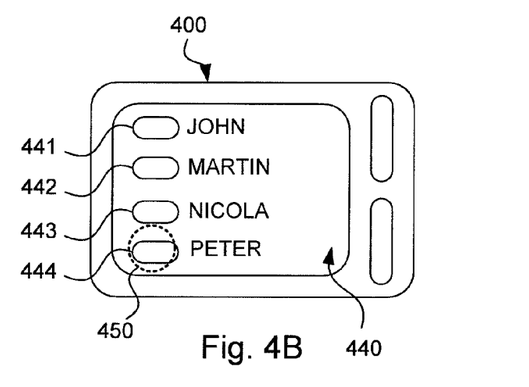

As the controller (not shown in FIG. 4A, but referenced 210 in FIG. 2) detects that such an event has occurred, the controller causes the display 420 to display the graphical representation of the second user interface state. In this example the event is a re-orientation of the mobile communications terminal 400 and the graphical representation of the user interface of the user interface state will be adapted accordingly changing from a portrait to landscape mode. The resulting (second) graphical representation of the user interface is shown in FIG. 4B. It should be noted that the arrangement of the virtual buttons 441-444 and the text fields 445-448 has changed although their interrelated arrangement is the same. For example, the virtual buttons 441-444 are arranged along a long edge of the display in FIG. 4A, but along a short edge of the display in FIG. 4B.

Also indicated in FIG. 4B is the same touch area 450 as in FIG. 4A. It can here be clearly seen that the touch area 450 overlaps one virtual button 441 in FIG. 4A, but a second virtual button 444 in FIG. 4B. According to prior art mobile communications terminals the input would be interpreted as being aimed at the second virtual button 444, whereas the user may not have been aware of the upcoming graphical representation of the user interface change. One situation where this is possible is when the user is holding his mobile communications terminal 400 slightly angled and accidentally tilts the mobile communications terminal just a little bit causing the mobile communications terminal to determine that it should change the user interface state. The user may, in such a situation, not have time to react to the sudden change of graphical representation of the user interface and not be able to abort his input action before the input is registered by the mobile communications terminal 400.

Another situation is when the controller or processor is overloaded or under heavy processing load, in which case the processor may not have enough processor power available to change the graphical representation of the user interface as the user interface changing event happens. This causes a time interval during which the mobile communications terminal 400 is in a second user interface state, but a graphical representation of the user interface of a first user interface state is displayed. This causes all inputs in this time interval to be wrongly interpreted by prior art mobile communications terminals.

Figure 5:
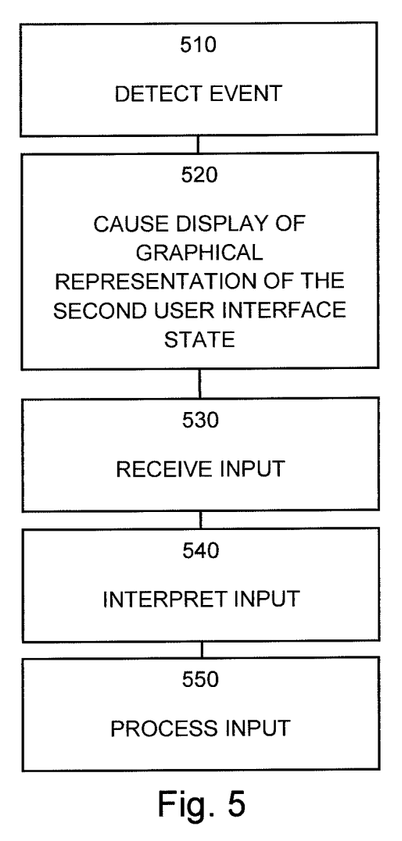
FIG. 5 shows a flowchart for a method according to one embodiment of the teachings of this application.

FIG. 5 shows a flow chart of how a method of how a mobile communications terminal can overcome the problems listed above, and also the problems listed in the background section and other where in this description.

The mobile communications terminal detects 510 a user interface state changing event and causes the display to display 520 a graphical representation of the user interface of a second user interface state. The mobile communications terminal further receives an input 530 and determines how to interpret 540 the input based on a time from the event. The input is then processed 550 according to the interpretation.

One specific example embodiment will now be described with reference to FIG. 5. The controller detects 510 a user interface changing event when a browser application (not shown, but referenced 250 in FIG. 2) receives a HTML5 server-sent event for a chat invitation. In response thereto the controller changes from said first user interface state to a second user interface state by causing a JavaScript callback to construct a new absolutely positioned <div> DOM (Document Object Model) node as pop-up notification box and also causes said display (120) to display 520 a representation of said second user interface state, whereby the browser application (250) renders the modified DOM on the display (120). The controller also receives an input 530 by the browser application receiving a touch input event and registering the event in an event buffer. The controller interprets 540 said input based on a time period to said event, whereby the browser application reads the touch input event from the event buffer and interprets it, and the controller process 550 said input according to said interpretation. Based on browser application's interpretation, the touch input can either be applied to the changed DOM which is the pop-up notification box or the previous state of the DOM which is whatever that lies beneath the notification box.

In one embodiment the controller is configured to interpret the input so that if the input is received within a first time period from the detection of the event, the input is interpreted as having been made in the first user interface state. This enables the mobile communications terminal to avoid mistaken input made by the user.

In one embodiment the controller is configured to interpret the input so that if the input is received within a first time period from the detection of the event, the input is ignored. This enables the mobile communications terminal to avoid mistaken input made by the user and allows the user to input the same input again at a later stage when it is clear to the user which graphical representation of the user interface is in effect. In one embodiment the input is ignored by being deleted from an input buffer.

In one embodiment the input is ignored by cancelling any activities that have been initiated by the input thereby nullifying the input.

It should be noted that all activities may not be easily ignored or cancelled. For some actions it is not possible to cancel the action for example if the action has been initiated using remote systems.

In one embodiment actions in certain applications should not be ignored irrespective of when they are being input. One example of such an application is a gaming application.

It should be noted that the manner of interpreting the input may be based on which application is receiving the input.

In one embodiment the first time period is 0.2 seconds, 0.4 seconds, 0.8 seconds or 1.6 seconds or any value in between.

In one embodiment the first time period is set by a user. In one embodiment the first time period is based on statistics on or of heuristics of user input.

In one embodiment the controller is configured to interpret an input by postponing the input until after the application or action causing the user interface changing event has finished execution. This allows for a user to focus on one application or action at a time.

In one embodiment the controller is configured to display a prompt requesting the user to confirm that an input should be ignored and only ignore the input if the user gives his acceptance.

Figure 6A:
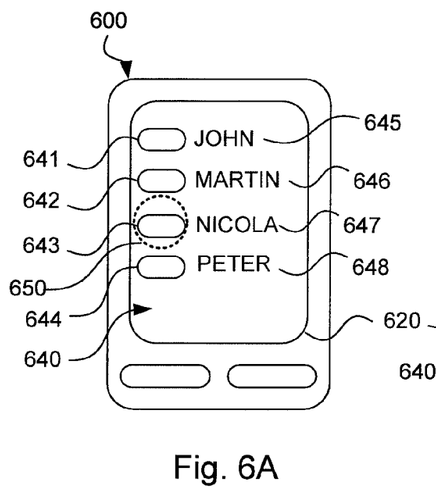
FIGS. 6A and 6B each shows a mobile communications terminal displaying a user interface state according to one embodiment of the teachings of this application.
Figure 6B:
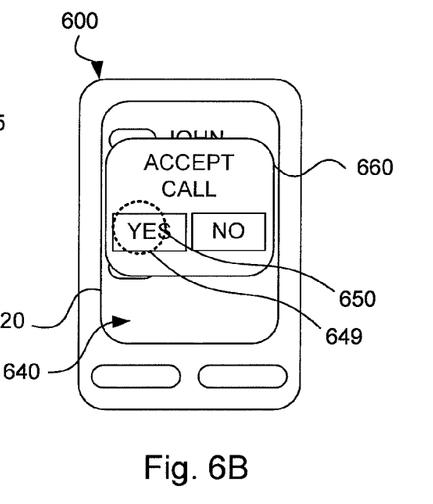

Another example of when the user interface state changes is when an application displays a window or different user interface state. One such example is when the mobile communications terminal is operating in a first user interface state related to a first application, for example a phone book application, when an incoming message is received and notified by displaying a window prompting the user to select whether he wants to read the message or not. FIG. 6A shows an example of a mobile communications terminal 600 displaying a graphical representation of the user interface 640 of a phone book application. Displayed are text fields 645-648 indicating the name of contacts along with virtual buttons 641-644 for initiating communication, for example via a chat application, with the corresponding contact. In this example, the user is aiming to initiate a chat communication with a contact "Nicola" by touching the corresponding virtual button 643. This is indicated with a touch area 650. Substantially simultaneously an incoming call is received. This is a user interface state changing event as the mobile communications terminal 600 is (commonly) configured to either change the graphical representation of the user interface completely or display a prompting window indicating that a call is incoming and from whom. FIG. 6B shows an example of such a prompt 660. In this example the user does not have time to react before touching the display 620 and the touch area 650 overlaps a virtual button 649 for accepting the incoming call. In a prior art mobile communications terminal the resulting action will be that the call is accepted, without the user having knowledge of whom the call is from thereby depriving the user his possibility of choosing whether to accept or dismiss the call. The manner taught with reference to FIG. 5 also solves this problem by either executing the first step in initiating a chat communication, or ignoring the input. The user will have to make his input again, but this time he will know the exact meaning of the input and the consequences.

To enable the controller to accommodate for periods of high processor load during which the controller may be slow in updating or displaying the graphical representation of the second user interface state, the controller is configured to interpret the input so that if the input is received within a second time period before the detection of the event, the input is interpreted as having been made in the first user interface state.

An alternative to enabling the controller to accommodate for periods of high processor load during which the controller may be slow in updating or displaying the graphical representation of the second user interface state, is to configure the controller to interpret the input so that if the input is received within a second time period before the detection of the event, the input is ignored.

This enables the mobile communications terminal to adapt to periods of high processor load and avoid erroneously inputs. During such times of high processor load a controller may otherwise erroneously determine that the event and the input happened in a different order. This is a plausible problem in multitasking systems, possibly having multiple processor cores, as is common in contemporary mobile communications terminals.

In one embodiment the second time period is 0.2 seconds, 0.4 seconds, 0.8 seconds or 1.6 seconds or any value in between.

In one embodiment the second time period is relative and depends on the number of events in an input buffer. For example, the second time period may include the input events stored in an input buffer and which have not yet been processed. In such an embodiment the controller is configured to clear the input buffer as a user interface changing event is detected.

In one embodiment the second time period is set by a user. In one embodiment the second time period is based on statistics on or of heuristics of user input.

A further alternative to enabling the controller to accommodate for periods of high processor load during which the controller may be slow in updating or displaying the graphical representation of the second user interface state, is to configure the controller to determine whether the graphical representation of the second user interface state is displayed or not. If the graphical representation of the second user interface state is not displayed, the controller is configured to interpret the input as having been made in the first user interface state.

Figure 7:
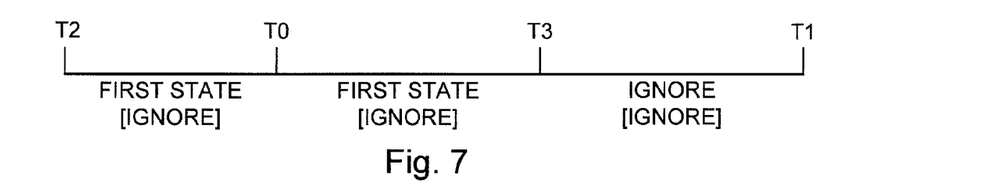
FIG. 7 shows a time graph according to one embodiment of the teachings of this application.

FIG. 7 shows a schematic view of a time graph of events and the corresponding interpretation of inputs according to one embodiment of the teachings herein. At a time T0 the user interface changing event is detected. Any input received within a time period T2 before the event is detected will either be ignored or interpreted as having been made in the first user interface state, as has been disclosed above. In one embodiment an event received within the time period T2 will be ignored by being cancelled. This ensures that any activities that have been initiated by the input is cancelled thereby nullifying the input. At a time T3, the controller detects that the graphical representation of the second user interface state is displayed. Any input received before this, but after the event is detected (T2<T<T3) is interpreted as having been made in the first user interface state. T3 is typically about 20 ms, but can be as long as a few seconds depending on the current load of the controller or processor. As also disclosed above, an input received within a first time period T1 will be interpreted as having been made in the first user interface state or ignored, depending on the embodiment chosen by the designer of the mobile communications terminal, by the designer of an application or by the user of the mobile communications terminal. In one embodiment the first time period T1 starts at T0. In one embodiment the first time period T1 starts at T3. In the situations when T3 is small it will have little effect if T1 starts at T0 or if T1 starts at T3, but if T3 is long, it may even be longer than T1 in which case T1 will not have any effect on the input system. In FIG. 7 one example of possible interpretations is given for each time period. In the example given in FIG. 7 the controller will interpret the input as having been made within the first user interface state if the input is received before the event (at point T0), as having been made within the first user interface state if the input is received before the user interface representation has been updated on a display (at point T3) and ignored if the input is received within the first time period (point T1). This ensures that any input received around the event is interpreted as being in the first state, whereas any input received shortly after the graphical representation has been updated is ignored giving the user ample time to react to the change of user interface states. In FIG. 7 a further example of possible interpretations is also given for each time period in brackets. In the alternative embodiments all inputs received within T2 and T1 are ignored ensuring that the user is aware of the UI changing event and is thus aware of the input made and the effect of the input.

For progressively changing graphical representation of the user interfaces it may be difficult or impossible to determine which user interface state the mobile communications terminal is operating in at any time, and especially for determining which state an input refers to. For example, when downloading a webpage, the graphical representation of the user interface may change gradually. In such situations it may be best to ignore any input received while downloading the web page or between updates of the graphical representation, or utilize long time periods—indicating a stable view of the graphical representation of the user interface.

Figure 8:
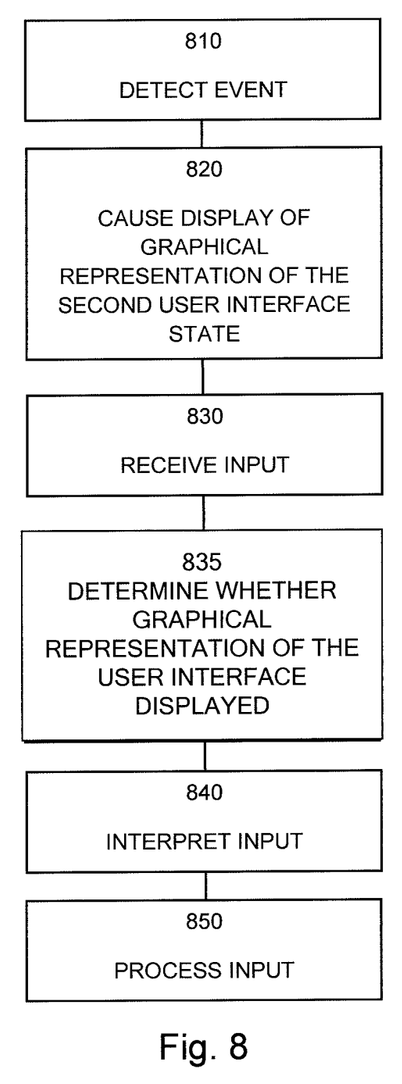
FIG. 8 shows a flowchart for a method according to one embodiment of the teachings of this application.

FIG. 8 shows a flow chart of how a method of how a mobile communications terminal can overcome the problems listed above, and also the problems listed in the background section and other where in this description.

The mobile communications terminal detects 810 a user interface state changing event and causes the display to display 820 a graphical representation of the user interface of a second user interface state. The mobile communications terminal further receives an input 830, determines if the graphical representation of the second user interface state is being displayed and determines how to interpret 840 the input based on a time from the event and whether the graphical representation of the second user interface state is being displayed. The input is then processed 850 according to the interpretation.

Figure 9A:
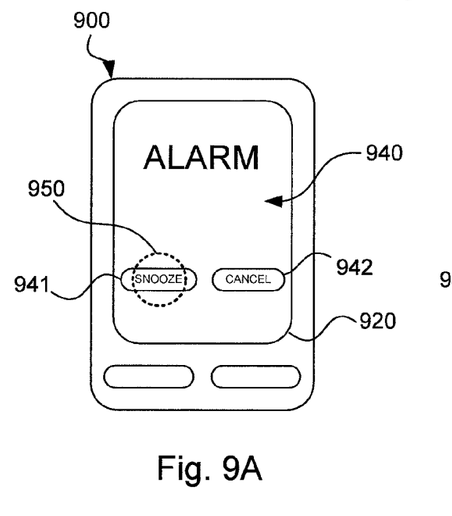
FIGS. 9A and 9B each shows a mobile communications terminal displaying a user interface state according to one embodiment of the teachings of this application.
Figure 9B:
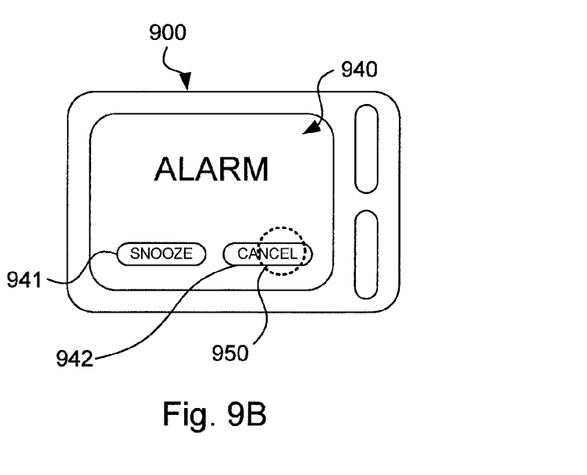

FIGS. 9A and 9B illustrate another problem situation. In FIG. 9A a mobile communications terminal 900 is lying flat on a surface, for example a bedside table. An application, for example an alarm is activated and corresponding graphic representation of the first user interface state is displayed having two virtual buttons 941, 942. One button 941 being for snoozing an alarm function and the other button 942 for cancelling the alarm. As the mobile communications terminal 900 is lying flat on a surface, the graphic representation 940 will be displayed in a portrait orientation. A user tilts the mobile communications terminal 900 to better reach the button and touches the snooze button 941. However, during the tilting movement the position detecting device (referenced 235 in FIG. 2) senses a change in orientation and causes a user interface change, see FIG. 9B, where by the graphic representation 940 is displayed in a landscape orientation. However, since the user is already in the middle of his action of touching the button, he does not have time to notice that the orientation is changing and his touch input mistakenly targets the cancel button 942. The immediate result is that the alarm is stopped, regardless of which button is pressed and the user will thus not be aware that the wrong input has been received by the mobile communications terminal 900 until it is too late. In this example, the user will most likely oversleep as the alarm has been cancelled instead of snoozed, which the user is totally unaware of Especially if the update of the graphical representation of the user interface is slow. The manner taught herein solves this problem. A mobile communications terminal that is configured to use the manners taught herein will thus provide a different result for a specific input in a specific user interface mode depending on the timing of the specific input. A mobile communications terminal utilizing the teachings herein would be identified by showing that an input is treated differently depending on how close to the user interface changing event the input is received.

One benefit of the teachings herein is that a user will be made aware of what actions or consequences will be effected as the user makes an input.

Another benefit of the teachings herein lies in that the mobile communications terminal will be enabled to adapt to high processor loads and ensure that the input received is timed correctly to the display of a changed user interface state.

Another benefit of the teachings herein lies in that user input will be interpreted according to the user's assumed wishes instead of being erroneously interpreted based on a mismatch between an internal user interface state and a display of another user interface state's graphical representation.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile communications terminal, comprising:
   memory;
   a display configured to display a representation of a first user interface state; and
   a controller circuit, wherein the controller circuit is configured to:
      detect a user interface changing event that causes a change from the first user interface state to a second user interface state;
      in response to detecting the event:
         change from the first user interface state to the second user interface state; and
         cause the display to display a representation of the second user interface state;
      receive an input;
      interpret the input based on first and second time periods that commence at a time of detecting the event as follows:
         interpret the input based on the first user interface state when the input is received in the first time period; and
         interpret the input as being null and void when the input is received after the first time period but in the second time period, wherein the second time period is greater than the first time period; and
      process the input according to the interpretation.

2. The mobile communications terminal of claim 1, wherein the first time period is user-selectable.

3. The mobile communications terminal of claim 1, wherein the controller circuit is configured to adapt the first time period based on statistics of user input.

4. The mobile communications terminal of claim 1, wherein the controller circuit is configured to adapt the first time period based on a processing load of the controller circuit.

5. The mobile communications terminal of claim 1, wherein the controller circuit is configured to interpret the input as being based on the first user interface state when the input is received within a third time period that ends at a time before detecting the event.

6. The mobile communications terminal of claim 5, wherein the third time period is user-selectable.

7. The mobile communications terminal of claim 5, wherein the controller circuit is configured to adapt the third time period based on statistics of user input.

8. The mobile communications terminal of claim 5, wherein the controller circuit is configured to adapt the third time period based on a processing load of the controller circuit.

9. The mobile communications terminal of claim 1, wherein the user interface changing event is a change in position or orientation of the mobile communications terminal.

10. The mobile communications terminal of claim 1, wherein the user interface changing event is a change by an application of an operational status of the application, the application being performed by the mobile communications terminal.

11. The mobile communications terminal of claim 1, wherein the user interface changing event is an initiation by an application of downloading a web page while displaying that web page, the application being performed by the mobile communications terminal.

12. The mobile communications terminal of claim 1, wherein the second time period is user-selectable.

13. The mobile communications terminal of claim 1, wherein the controller circuit is configured to adapt the second time period based on statistics of user input.

14. The mobile communications terminal of claim 1, wherein the controller circuit is configured to adapt the second time period based on a processing load of the controller circuit.

15. The mobile communications terminal of claim 1, wherein an end of the first time period corresponds to a time at which the controller circuit causes the display to display the representation of the second user interface state.

16. A method for use in a mobile communications terminal, the mobile communications terminal comprising memory, a display configured to display a representation of a first user interface state, and a controller circuit, the method comprising:
   detecting a user interface changing event that causes a change from the first user interface state to a second user interface state;
   in response to detecting the event:
      changing from the first user interface state to the second user interface state; and
      causing the display to display a representation of the second user interface state;
   receiving an input;
   interpreting the input based on first and second time periods that commence at a time of detecting the event as follows:
      interpreting the input based on the first user interface state when the input is received in the first time period; and
      interpreting the input as being null and void when the input is received after the first time period but in the second time period, wherein the second time period is greater than the first time period; and
   processing the input according to the interpretation.

17. A computer program product stored in a non-transitory computer readable medium for controlling a mobile communications terminal, the mobile communications terminal comprising memory, a display configured to display a representation of a first user interface state, and a controller circuit, the computer program product comprising software instructions which, when run on controller circuit, causes the mobile communications terminal to:
   detect a user interface changing event that causes a change from the first user interface state to a second user interface state;
   in response to detecting the event:
      change from the first user interface state to the second user interface state; and
      cause the display to display a representation of the second user interface state;
   receive an input;

interpret the input based on first and second time periods that commence at a time of detecting the event as follows:
  interpret the input based on the first user interface state when the input is received in the first time period; and
  interpret the input as being null and void when the input is received after the first time period but in the second time period, wherein the second time period is greater than the first time period; and
process the input according to the interpretation.

18. A mobile communications terminal, comprising:
memory;
a display configured to display a representation of a first user interface state; and
a controller circuit, wherein the controller circuit is configured to:
  detect a user interface changing event that causes a change from the first user interface state to a second user interface state;
  in response to detecting the event:
    change from the first user interface state to the second user interface state; and
    cause the display to display a representation of the second user interface state;
  receive an input;
  interpret the input as follows:
    when the input is received in a first time period that commences at a time of detecting the event, interpret the input as being null and void, wherein an end of the first time period corresponds to a time at which the controller circuit causes the display to display the representation of the second user interface state;
    when the input is received after the first time period but in a second time period that commences at the time of detecting the event, interpret the input as being null and void, wherein the second time period is greater than the first time period; and
    when the input is received in a third time period that ends before a time of detecting the event, interpret the input as being null and void; and
  process the input according to the interpretation.

* * * * *

UNITED STATES PATENT AND TRADEMARK OFFICE
CERTIFICATE OF CORRECTION

PATENT NO. : 9,804,706 B2  
APPLICATION NO. : 14/440913  
DATED : October 31, 2017  
INVENTOR(S) : Song Yuan Page 1 of 1

It is certified that error appears in the above-identified patent and that said Letters Patent is hereby corrected as shown below:

On the Title Page

In Item (54), in Title, in Column 1, Line 2, delete "INPUT" and insert -- AN INPUT --, therefor.

In the Drawings

In Fig. 2, Sheet 1 of 4, delete "FIG 2" and insert -- FIG. 2 --, therefor.

In the Specification

In Column 1, Line 2, delete "INPUT" and insert -- AN INPUT --, therefor.

In Column 2, Line 49, delete "FIG. 1A and 1B" and insert -- FIGS. 1A and 1B --, therefor.

In Column 4, Line 65, delete "described in the above." and insert -- described above. --, therefor.

In Column 5, Lines 26-27, delete "application specific circuits (ASIC)," and insert -- application specific integrated circuits (ASIC), --, therefor.

In Column 6, Line 60, delete "shows a flow chart of how a method of how a" and insert -- shows a flow chart of how a method of a --, therefor.

In Column 10, Line 9, delete "shows a flow chart of how a method of how a" and insert -- shows a flow chart of how a method of a --, therefor.

In Column 10, Lines 49-50, delete "of Especially" and insert -- of. Especially --, therefor.

Signed and Sealed this  
Thirteenth Day of August, 2019

Andrei Iancu  
*Director of the United States Patent and Trademark Office*